(12) United States Patent
Takagi et al.

(10) Patent No.: US 10,051,835 B2
(45) Date of Patent: Aug. 21, 2018

(54) EXCRETA TREATMENT MATERIAL

(71) Applicant: Unicharm Corporation, Ehime (JP)

(72) Inventors: Chiyo Takagi, Kagawa (JP); Shinya Kaneko, Kagawa (JP); Takeshi Ikegami, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 15/314,872

(22) PCT Filed: Jan. 22, 2015

(86) PCT No.: PCT/JP2015/051684
§ 371 (c)(1),
(2) Date: Nov. 29, 2016

(87) PCT Pub. No.: WO2015/182164
PCT Pub. Date: Dec. 3, 2015

(65) Prior Publication Data
US 2017/0202175 A1    Jul. 20, 2017

(30) Foreign Application Priority Data
May 30, 2014    (JP) ................. 2014-113541

(51) Int. Cl.
*A01K 1/01*    (2006.01)
*A01K 1/015*    (2006.01)

(52) U.S. Cl.
CPC .......... *A01K 1/0154* (2013.01); *A01K 1/0155* (2013.01); *A01K 1/0107* (2013.01)

(58) Field of Classification Search
None
See application file for complete search history.

(56) References Cited

U.S. PATENT DOCUMENTS 4,407,231 A * 10/1983 Colborn ............... A01K 1/0152
119/171
2010/0136128 A1    6/2010 Hurwitz et al.
(Continued)

FOREIGN PATENT DOCUMENTS

CN    1736178 A  *  2/2006
JP    1999-32607      2/1999
(Continued)

OTHER PUBLICATIONS

English translation of CN 1736178 A. Translation Obtained from Google Patents at https://patents.google.com/patent/CN1736178A/en on Jun. 7, 2017. Originally Published in Chinese on Feb. 22, 2006. 8 printed pages.*

*Primary Examiner* — Isaac Shomer
(74) *Attorney, Agent, or Firm* — Brinks Gilson & Lione

(57) ABSTRACT

An excreta treatment material in which the effect of chemicals including a perfume can be efficiently and sufficiently exhibited. This excreta treatment material is configured from a plurality of particulate substances, wherein the plurality of particulate substances comprises a mixture of base granules composed of aggregates of a water-absorbing particulate substance and chemical granules composed of aggregates of a chemical-containing particulate substance, the chemical granules moving upward upon application of vibration to the mixture.

9 Claims, 5 Drawing Sheets

(56) References Cited

U.S. PATENT DOCUMENTS

| | | | |
|---|---|---|---|
| 2011/0303156 A1* | 12/2011 | Sikka | A01K 1/0107 |
| | | | 119/165 |
| 2015/0181833 A1 | 7/2015 | Hiroshima et al. | |
| 2015/0351362 A1 | 12/2015 | Hiroshima et al. | |
| 2017/0105384 A1* | 4/2017 | Waters | A01K 1/0114 |

FOREIGN PATENT DOCUMENTS

| | | |
|---|---|---|
| JP | 2004-33047 A | 2/2004 |
| JP | 2010-246416 A | 11/2010 |
| JP | 2010-247013 A | 11/2010 |
| JP | 2012-55241 A | 3/2012 |
| WO | WO 2012-057825 A1 | 5/2012 |
| WO | WO 2013/183390 A1 | 12/2013 |
| WO | WO 2014/007053 A1 | 1/2014 |

* cited by examiner

F I G. 2
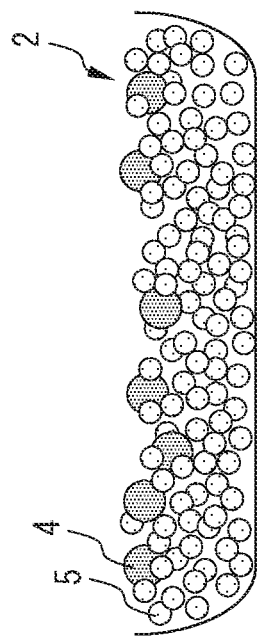
(a)
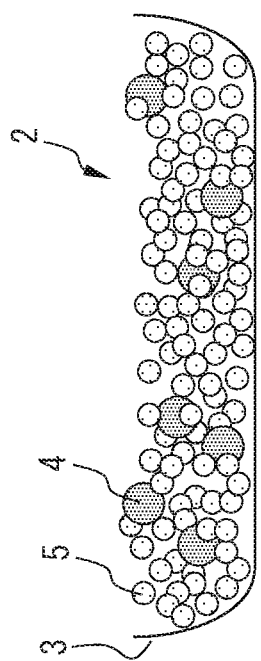
(b)

FIG. 4
(a) 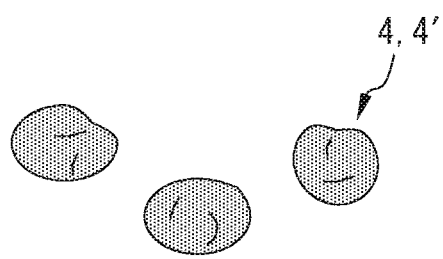
(b) 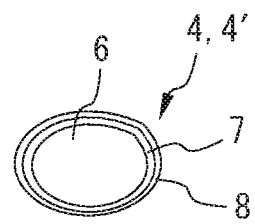
FIG. 5
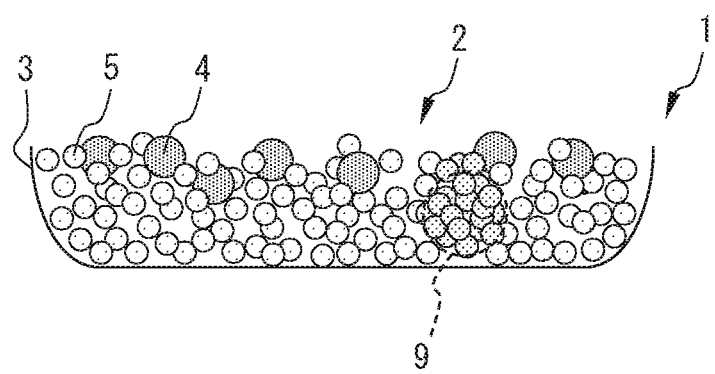

EXCRETA TREATMENT MATERIAL

RELATED APPLICATION

This application is a 35 U.S.C. § 371 national phase filing of International Patent Application No. PCT/JP2015/051684, filed Jan. 22, 2015, through which and to which priority is claimed under 35 U.S.C. § 119 to Japanese Patent Application No. 2014-113541, filed May 30, 2014, the complete disclosure of which is hereby expressly incorporated by reference.

TECHNICAL FIELD

The present invention relates to an excreta treatment material including a functional chemical agent, such as a perfume or antimicrobial agent.

BACKGROUND ART

In the prior art, toilets for animals such as dogs and cats have been known which employ materials for disposal of excreta treatment materials comprising granules with a water absorbing property laid out in a tray-like toilet container. The excreta treatment material contains a substance that eliminates odor generated from animal feces and urine, by the fragrance of a perfume.

PTL 1, for example, discloses an excreta treatment material for animals that maintains the fragrance effect of the perfume in a prolonged and stable manner by spraying a perfume and a perfume volatilization inhibitor onto the surfaces of particles imparted with a water-absorbing property, to form a perfume-impregnated layer on the surface layer section of the particles.

Generally, such a particulate substance (chemical granules) containing a chemical agent such as a perfume is used in admixture with an ordinary particulate substance (base granules) having the same shapes, particle size and specific gravity, and the excreta treatment material comprising the mixture is laid out in a toilet container with the chemical granules evenly dispersed in the base granules.

CITATION LIST

Patent Literature

[PTL 1] Japanese Unexamined Patent Publication No. 2004-33047

SUMMARY OF INVENTION

Technical Problem

However, when chemical granules are evenly dispersed in base granules, many chemical granules are present that are not exposed on the surface of the excreta treatment material, and therefore the effect of the chemical agent (the fragrance effect, in the case of a perfume) has often been inadequately exhibited.

It is therefore an object of the present invention to provide an excreta treatment material that can efficiently and adequately exhibit the effects of chemical agents such as perfumes.

Solution to Problem

The present invention is an excreta treatment material comprising a plurality of particulate substances, the plurality of particulate substances comprising a mixture of a base granule group composed of aggregates of a water-absorbing particulate substance (base granules), and a chemical granule group composed of aggregates of a chemical-containing particulate substance (chemical granules), the chemical granule group being displaced upward upon application of vibration to the mixture.

With the excreta treatment material of the present invention, the chemical granule group containing a chemical agent such as a perfume is displaced upward, exposing the chemical granules on the surface of the excreta treatment material, when vibration is applied to the excreta treatment material by activity when an animal such as a cat or dog scratches the excreta treatment material during excretion, or when the owner removes excreta with a scoop, thereby forming a state in which the volatile components in the chemical agent are readily released into the air, or a state in which the chemical granules easily contact with liquid excreta such as urine, and thus the effect of the chemical agent such as a perfume can be more efficiently and adequately exhibited compared to a conventional excreta treatment material for animals.

Advantageous Effects of Invention

According to the present invention it is possible to provide an excreta treatment material that can efficiently and adequately exhibit the effects of chemical agents such as perfumes.

BRIEF DESCRIPTION OF DRAWINGS

FIG. 2(a) is a cross-sectional diagram showing the state of an excreta treatment material according to an embodiment of the present invention, immediately after it has been laid out in a toilet container, and FIG. 2(b) is a cross-sectional diagram showing the state after vibration has been applied to the excreta treatment material by an animal or owner, or the like.

FIG. 3(a) is a cross-sectional diagram showing the state of an excreta treatment material according to another embodiment of the present invention, immediately after it has been laid out in a toilet container, and FIG. 3(b) is a cross-sectional diagram snowing the state after vibration has been applied to the excreta treatment material by an animal or owner, or the like.

FIG. 4(a) is a perspective view of chemical granules in an excreta treatment material of the present invention, and FIG. 4(b) is a cross-sectional diagram thereof.

FIG. 5 is a cross-sectional diagram schematically showing the state of an animal toilet employing an excreta treatment material according to an embodiment of the present invention, after an animal has excreted urine.

DESCRIPTION OF EMBODIMENTS

Preferred embodiments of the excreta treatment material according to an embodiment of the present invention will now be described in detail with reference to the accompanying drawings.

Figure 1:
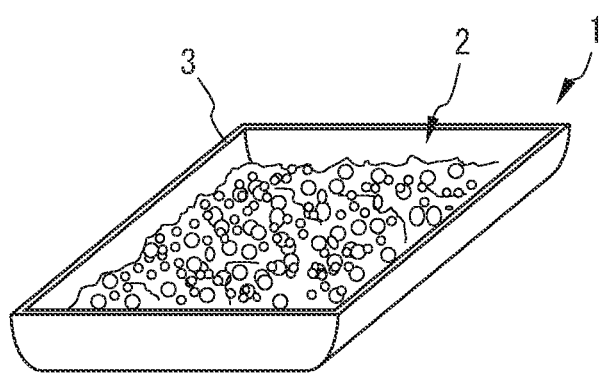
FIG. 1 is a perspective view of an animal toilet employing an excreta treatment material according to an embodiment of the present invention.

FIG. 1 is a perspective view of an animal toilet 1 employing an excreta treatment material of the present invention. The excreta treatment material 2 for animals according to this embodiment of the present invention is laid out in a tray-like toilet container 3 and used as an absorber for the animal toilet 1.

FIG. 2(a) is a cross-sectional diagram showing the state of an excreta treatment material 2 according to an embodiment of the present invention, immediately after it has been laid out in a toilet container 3 for animals, and FIG. 2(b) is a cross-sectional diagram showing the state after vibration such as agitation has been applied to the excreta treatment material 2 by an animal or owner, or the like. As shown in FIG. 2(a), the excreta treatment material 2 according to this embodiment of the present invention comprises a mixture of a chemical granule group composed of aggregates of chemical granules 4, which are a chemical-containing particulate substance such as a perfume, and a base granule group composed of aggregates of base granules 5, which is a water-absorbing particulate substance. For this embodiment, the particle size of the particulate substance at the median mass of the aggregates of the chemical granules 4 composing the chemical granule group is larger than the particle size of the water-absorbing particulate substance at the median mass of the aggregates of the base granules 5 composing the base granule group.

As used herein, the "particle size" is the size of the particulate substance determined by a sieve screening method, i.e. based on the sieve mesh opening, and specifically, it is the particle size (mm) of the particulate substance at the median mass, i.e. corresponding to 50 mass %, determined from the particle size distribution obtained by a sieve screening method. The particle size distribution can be obtained using a vibrating sifter (for example, a Model AS-200 by Retsch Corp.) comprising multiple sieves with different mesh openings, sifting a prescribed mass of the particulate substance (for example, 150 g) for a prescribed time period (for example, 3 minutes), and calculating the mass percentage from the mass (g) of particulate substance remaining on each sieve.

The excreta treatment material 2 of this embodiment, when laid out in a toilet container 3 as shown in FIG. 2(a), has the chemical granules 4 evenly dispersed in the base granule group; however, since the particle size of the particulate substance at median mass of the aggregates of the chemical granules 4 is larger than the particle size of the water-absorbing particulate substance at median mass of the aggregates of the base granules 5, when vibration such as agitation is applied to the excreta treatment material 2 by the action of scratching of the excreta treatment material 2 by an animal or removal of the excreta by an owner, the chemical granules 4 are displaced upward and are exposed on the surface of the excreta treatment material 2, as shown in FIG. 2(b).

The phenomenon by which chemical granules of larger particle size become maldistributed further upward than the base granules of smaller particle size, by the action of vibration such as agitation, is a phenomenon that occurs regardless of the specific gravity, etc. of the particles, so long as the chemical granules and the base granules are composed of materials commonly used in the relevant field, and while the mechanism is not clearly understood, it is conjectured that when vibration such as agitation is applied to a system of particles or large particle size evenly dispersed in particles of small particle size, the particles of small particle size fall through the gaps below the particles of large particle size by gravity each time the system is vibrated, and that continuation of such action causes the particles of small particle size to be maldistributed downward relative to the excreta treatment material, resulting in upward displacement of the particles of large particle size, and causing them to rise upward.

Thus, since the excreta treatment material of this embodiment has more of the chemical granules exposed on the surface of the excreta treatment material, the volatile components in the chemical agent can be more easily released into the air, and the chemical granules can more easily form a state of contact with liquid excreta such as urine, thereby allowing the effect of the chemical agent, such as a perfume, to be more efficiently and adequately exhibited.

Moreover, for this embodiment, the difference between the particle size of the particulate substance at the median mass of the aggregates of the chemical granules composing the chemical granule group and the particle size of the water-absorbing particulate substance at the median mass of the aggregates of the water-absorbing particulate substance composing the base granule group, is preferably 2 mm or greater. With such a construction, the chemical granules of large particle size more easily rise, while the chemical granules become easily maldistributed further upward than the base granules by simply housing the excreta treatment material in the toilet container.

An excreta treatment material according to another embodiment of the present invention will now be described. FIG. 3(a) is a cross-sectional diagram showing the state of an excreta treatment material 2 according to another embodiment of the present invention, immediately after it has been laid out in a toilet container 3 for animals, and FIG. 3(b) is a cross-sectional diagram showing the state after vibration such as agitation has been applied to the excreta treatment material 2 by an animal or owner, or the like. As shown in FIG. 3(a), for this embodiment, the excreta treatment material 2 comprises a mixture of a chemical granule group composed of aggregates of chemical granules 4', which are a particulate substance containing a chemical agent such as a perfume and having relatively low bulk specific gravity, and a base granule group composed of aggregates of base granules 5', which is a water-absorbing particulate substance with relatively high bulk specific gravity. Throughout the present description, "bulk specific gravity" refers to the physical property value obtained by dividing the total mass of the particulate substance, when the particulate substance has been filled to the brim in a container having a fixed volume (for example, 1 L), by said volume, and converting the value to units of $g/cm^3$.

Moreover, for this embodiment, the chemical granules 4' and the base granules 5' have approximately the same particle size; however, the particle size of the chemical granules 4' may also be larger than the particle size of the base granules 5', as in the embodiment described above. As used herein, "approximately the same particle size" includes not only exactly the same particle size, but also particle sizes in a permissible range during the production process (in a range of ±20%).

Figure 3:
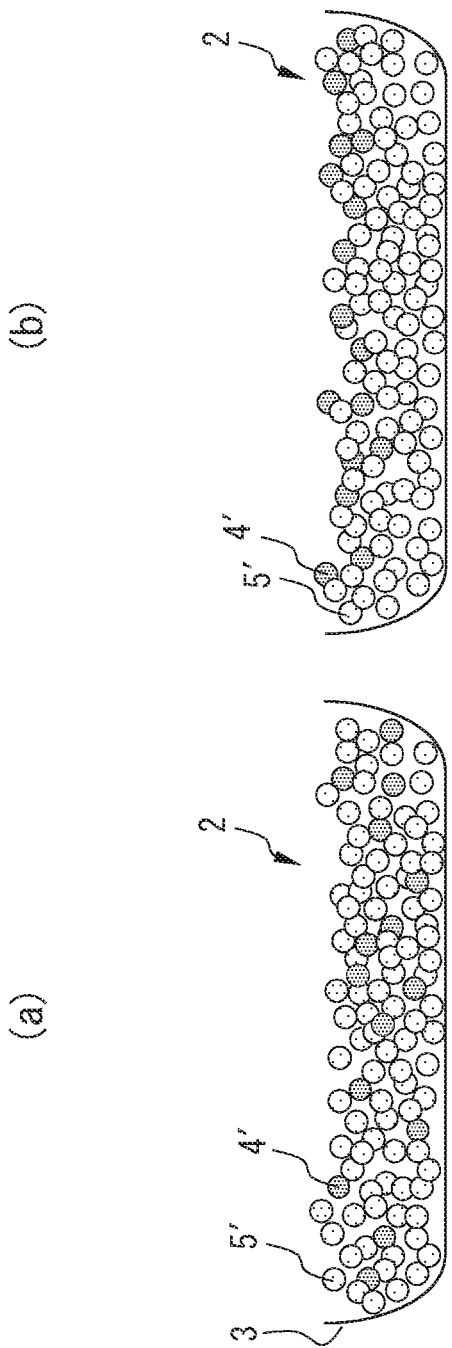

The excreta treatment material 2 according to another embodiment of the present invention, when laid out in a toilet container 3 as shown in FIG. 3(a), has the chemical granules 4' evenly dispersed in the base granule group; however, since the bulk specific gravity of the chemical granules 4' is lower than the bulk specific gravity of the base granules 5', when vibration such as agitation is applied to the excreta treatment material 2 by the action of scratching of the excreta treatment material 2 by an animal or removal of the excreta by an owner, the chemical granules 4' are displaced upward and are exposed on the surface of the excreta treatment material 2, as shown in FIG. 3(*b*). This is conjectured to occur because when vibration such as agitation is applied to a system having particles of low specific gravity evenly dispersed in particles of high specific gravity, the particles of high specific gravity migrate downward from the particles of low specific gravity by gravity each time the system is vibrated, and continuation of such action causes the particles of high specific gravity to be maldistributed downward relative to the excreta treatment material, resulting in upward rising of the particles of low specific gravity.

Thus, since the excreta treatment material of this embodiment as well has more chemical granules exposed on the surface of the excreta treatment material, the effect of the chemical agent such as a perfume can be exhibited more efficiently and adequately, similar to the embodiment described above.

Moreover, when the chemical granules with low bulk specific gravity and the base granules with high bulk specific gravity have approximately the same particle size as in this embodiment, it is possible to maldistributed the chemical granules further upward than the base granules simply by housing the excreta treatment material in the toilet container, and therefore even when the vibration applied by the animal or owner is minimal, more chemical granules can be exposed on the surface of the excreta treatment material, and the effect of the chemical agent can be more efficiently exhibited.

For this embodiment, the difference in bulk specific gravity between the chemical granules and the base granules is not particularly restricted, but from the viewpoint or allowing the chemical granules of low bulk specific gravity to rise more easily, the bulk specific gravity of the chemical granules is preferably no greater than ½ of the bulk specific gravity of the base granules.

Yet another embodiment of the present invention will now be explained. This embodiment combines features of each of the embodiments described above, the excreta treatment material comprising a mixture of a chemical granule group composed of aggregates of a particulate substance (chemical granules) containing a chemical agent and having relatively low bulk specific gravity and a base granule group composed of aggregates of a water-absorbing particulate substance (base granules) having relatively high bulk specific gravity, while the particle size of the particulate substance at median mass of the aggregates of the chemical granules composing the chemical granule group is larger than the particle size of the water-absorbing particulate substance at median mass of the aggregates of the base granules composing the base granule group.

In the excreta treatment material of this embodiment, the chemical granules rise even more easily due to the effect resulting from the difference in particle size and the difference in bulk specific gravity of the particles, and therefore even when the vibration applied by an animal or owner is minimal, numerous chemical granules can be exposed on the surface of the excreta treatment material, allowing the effect of the chemical agent to be more properly and more efficiently exhibited.

The chemical granules and base granules used in the excreta treatment material of the present invention will now be further explained. FIG. 4(*a*) is a perspective view schematically showing chemical granules to be used in the excreta treatment material of the invention, and FIG. 4(*b*) is a cross-sectional diagram thereof. As shown in FIG. 4(*a*), the chemical granules 4, 4' are normally not completely spherical but partially sunken, and thus have slightly distorted, approximately spherical shapes. For the present invention, the shapes of the chemical granules are not restricted to such shapes, and they may have any other shapes, such as cylindrical.

The particle size of the chemical granules is not particularly restricted and may be 4 mm or greater, for example, but from the viewpoint of easier rising of the chemical granules in the excreta treatment material and allowing particulate substances made of materials with lower specific gravity, such as paper, to be directly used as the chemical granules, it is preferably 6 mm or greater and more preferably 8 mm or greater. Also, the upper limit for the particle size of the chemical granules is not particularly restricted so long as it does not interfere with excretion by the animal, and it may be up to 30 mm, for example.

The specific gravity of the chemical granules is not particularly restricted and may be 0.1 to 1.5 $g/cm^3$ as the bulk specific gravity, for example, but from the viewpoint of easier rising of the chemical granules in the excreta treatment material and allowing particulate substances made of materials with lower specific gravity, such as paper, to be directly used as the chemical granules, it is preferably 0.1 to 0.6 $g/cm^3$ and more preferably 0.2 to 0.5 $g/cm^3$ as the bulk specific gravity.

The structure and composition of the chemical granules is also not particularly restricted, but the chemical granules preferably are made of a particulate substance that does not form hard masses when contacted with liquid excreta such as urine. Here, "hard masses" refers to a state in which two or more particulate substances adhere together, and "particulate substance that does not form hard masses" means that when artificial urine is dropped onto the particulate substance and allowed to stand, the particulate substance does not form hard masses even after a period of 10 minutes has elapsed. The artificial urine may be prepared by dissolving 200 g of urea, 80 g of sodium chloride, 8 g of magnesium sulfate, 3 g of calcium chloride and approximately 1 g of dye Blue #1 in 10 L of ion-exchanged water.

Chemical granules 4, 4' comprising a particulate substance that does not form hard masses may be a particulate substance including an approximately spherical water-absorbing base material 6 such as shown in FIG. 4(*b*), and a hydrophobic coating layer 7 that covers the water-absorbing base material 6, with a chemical agent 8 such as a perfume added to the surface of the hydrophobic coating layer. The water-absorbing particulate substance of the base granules is preferably a particulate substance that forms hard masses when contacted with liquid excreta such as urine.

The advantage of using a particulate substance that does not form hard masses as the chemical granules, will now be explained with reference to the accompanying drawings. FIG. 5 is a cross-sectional diagram schematically showing the state of an animal toilet 1 (specifically an animal toilet 1 in the state shown in FIG. 2(*b*)), employing an excreta treatment material 2 according to an embodiment of the present invention, after an animal has excreted urine. If the excreta treatment material 2 comprises a mixture of a base granule group composed of aggregates of base granules 5 and a chemical granule group composed of aggregates or chemical granules 4 that do not form hard masses as described above, when liquid excreta such as urine has been excreted from an animal, the liquid excreta passes through the chemical granule groups exposed on the surface of the excreta treatment material 2 and is absorbed at the base granule groups located at the lower end of the excreta treatment material 2, forming hard masses 9, and therefore the chemical granules 4 are less likely to become mixed in with the hard masses 9, and even when the owner has used a scoop to remove the hard masses 9, less of the chemical granules is removed along with the hard masses 9. As a result, the number of chemical granules is less likely to be reduced during the period in which the animal toilet used, and the effect of the chemical agent that has been added to the chemical granules can be exhibited continuously for a prolonged period.

The material forming the water-absorbing base material 6 of the chemical granules 4, 4' is not particularly restricted so long as it has a water-absorbing property, and for example, there may be used any materials known in the prior art, including organic materials such as paper, pulp, wood dust, okara, used tea leaves or water-absorbent polymers, and inorganic materials such as bentonite, zeolite or silica gel. Of these, the material forming the water-absorbing base material is preferably one including mainly an organic material such as paper or pulp, from the viewpoint of resistance to formation of hard masses when contacting liquid excreta such as urine, and easier production of chemical granules with the prescribed particle size or prescribed specific gravity. As used herein, "including mainly" means including at greater than 50 mass % of the entirety.

Also, the hydrophobic coating layer 7 of the chemical granules 4, 4' is formed by coating the surface of the water-absorbing base material 6 with a hydrophobic coating agent by spray atomizing or the like. The hydrophobic coating agent used may be a coating agent including a material that is insoluble or hardly soluble in water, or a coating agent having a water-absorbing property and becoming viscous upon absorbing water. Examples of the former include coating agents including polyethylene (PE), polypropylene (PP), polyethylene terephthalate (PET), paraffin, wax, rubber and the like, particularly preferred among which are those including at least one type of material selected from the group consisting of PE, PP and paraffin. When such coating agents are used, the hydrophobic coating layer that is formed will have a hydrophobic or water-repellent property, and therefore liquid excreta such as urine that has contacted the chemical granules will not seep into the water-absorbing base material at the interior of the chemical granules, and the liquid excreta will not putrefy or produce bad odor inside the water-absorbing base material. Examples of the latter include coating agents including ethylene-vinyl acetate copolymer (EVA), polyvinyl alcohol (PVA), starch, gelatin and the like, particularly preferred among which are those including either or both PVA and EVA. When such a hydrophobic coating agent is used, large amounts of liquid excreta contacting the chemical granules will not seep into the water-absorbing base material, and even if a slight amount of liquid excreta remains as residue on the surface of the water-absorbing base material, the liquid excreta is absorbed into the hydrophobic coating agent and incorporated into the interior of the water-absorbing base material with the passage of time, thereby avoiding putrefaction of and bad odor generation by the slight amounts of liquid excreta remaining as residue on the surface of the chemical granules.

Incidentally, a "water-absorbing property" of the hydrophobic coating agent means that the hydrophobic coating agent can absorb at least 1 mL of water per unit mass (1 g), and specifically, it means that the moisture absorption is at least 1 mL per unit mass, as obtained by immersing 50 g sample in 300 mL of water and allowing it to stand at room temperature (25° C.), and measuring the amount of additional mass of the sample after 10 minutes. Also, that the hydrophobic coating agent becomes "viscous upon absorbing water" means that the hydrophobic coating agent has a flow property when it has absorbed water, and specifically, it means that the room temperature viscosity of a liquid prepared by dissolving or dispersing 10 g of hydrophobic coating agent in 1 L or water is 1.004 mPa·s or greater.

Moreover, the hydrophobic coating layer may include an inorganic powder in order to obtain desired physical properties. Inorganic powders include talc, mica, kaolin, calcium carbonate, aluminum oxide and the like. The hydrophobic coating layer may also include other components as desired, such as color pigments.

The chemical agent to be added to the chemical granules will now be explained. The chemical agent used for the present invention is not particularly restricted so long as it can impart a prescribed function to the particulate substance, and for example, various functional chemical agents may be used, such as perfumes, antimicrobial agents, examination agents, hydrophilic agents, hydrophobic agents, deodorants, antiseptic agents, microbicides, mildew resistant agents and the like. These functional chemical agents may be used alone or in combinations of two or more. Among such functional chemical agents, it is most preferred to use one or more chemical agents selected from the group consisting of perfumes, antimicrobial agents, examination agents, hydrophilic agents, hydrophobic agents and deodorants, from the viewpoint of more effectively utilizing the advantage provided by exposure of the chemical granules on the surface of the excreta treatment material.

The perfume to be used in the chemical agent of the invention is not particularly restricted so long as it includes a compound that can serve as an aromatic component, and for example, there may be used components that include any compounds known in the prior art, including alcohols such as geraniol, thymol, menthol and benzyl alcohol, aldehydes such as hexylcinnamaldehyde, and oils. Furthermore, the perfume preferably further includes a dispersing agent for dispersion of the aromatic component in water. The dispersing agent may be a glycol or a polymer thereof, which is a liquid at ordinary temperature (25° C.) Preferred among these are one or more compounds selected from the group consisting of polypropylene glycol, propylene glycol, 1,4-butylene glycol, polyethylene glycol, 1,3-butylene glycol and dipropylene glycol, from the viewpoint of allowing more types of aromatic components to be dispersed in water. When a glycol polymer is used as the dispersing agent, it is preferred to use one having a molecular weight such that it is liquid at ordinary temperature.

According to the present invention, when a perfume is used as the chemical agent, the perfume is easily released into the air since the chemical granules are exposed on the surface of the excreta treatment material, and therefore the fragrance effect of the perfume can be efficiently and adequately exhibited. Also according to the present invention, an adequate fragrance effect is obtained even if the amount of added perfume is reduced, and therefore savings can be achieved in the amount of perfume added to the chemical granules, thereby reducing costs. Furthermore, as shown in FIG. 5, most of the liquid excreta that causes bad odor is absorbed in the water-absorbing property base granule group located below the chemical granule group, and therefore liquid excreta or hard masses of base granules that have absorbed liquid excreta become covered by the chemical granule group without being exposed on the surface of the excreta treatment material, making it possible to more effectively prevent bad odor caused by the liquid excreta from being released into the air.

Furthermore, the antimicrobial agent used in the chemical agent of the invention is not particularly restricted so long as it can inhibit proliferation of bacteria and the like, and there may be used any type of organic based, inorganic metallic, photocatalytic, natural or other type of antimicrobial agent. Most preferred for use among these are organic surfactant-type antimicrobial agents, from the viewpoint of allowing inhibition of proliferation of bacteria and the like even when liquid excreta such as urine has been absorbed in the water-absorbing base material. According to the present invention, when an antimicrobial agent is used as the chemical agent, and the chemical granules are exposed on the surface of the excreta treatment material, the liquid excreta such as urine, once excreted, is more likely to be absorbed in the base granules at the lower end after having contacted the chemical granules, and therefore the antimicrobial agent added to the chemical granules easily migrates or elutes into the liquid excreta, allowing proliferation of bacteria in the liquid excreta to be more efficiently prevented. As a result, it is possible to effectively prevent generation of bad odor by putrefaction of liquid excreta such as urine.

Examination agents to be used in the chemical agent of the present invention are not particularly restricted so long as they allow the state of health of the animal to be known, and for example, there may be suitably used chemical agents that undergo color change in response to components in urine, such as pH examination agents, protein examination agents, glucose examination agents, occult blood examination agents, urobilinogen examination agents and the like According to the present invention, when an examination agent is used as a chemical agent, and the chemical granules are exposed on the surface of the excreta treatment material, this increases the likelihood of urine contacting with the examination agent in the chemical granules after urination, and thus allows the function of the examination agent to be more efficiently and accurately exhibited. Also since an adequate effect is obtained even if the amount of added examination agent is reduced, savings can be achieved in the amount of examination agent added to the chemical granules, thereby reducing costs.

A hydrophilic agent to be used in the chemical agent of the present invention is not particularly restricted so long as it can render the particulate substance hydrophilic, and a surfactant, for example, may be used. According to the present invention, when a hydrophilic agent is used as the chemical agent, and the chemical granules are exposed on the surface of the excreta treatment material, the liquid excreta such as urine, once excreted, are more likely to be absorbed in the base granules at the lower end after having contacted the chemical granules, and therefore the hydrophilic agent that has been added to the chemical granules easily migrates into the base granules through the liquid excreta. As a result, during the next excretion, the portions where the hydrophilic agent is present have a higher moisture absorption speed and can therefore provide a spot absorption function.

A hydrophobic agent to be used in the chemical agent of the present invention is not particularly restricted so long as it can render the particulate substance hydrophobic, and for example, there may be used aliphatic hydrocarbons; silicone; fatty acids and their metal salts; polyglycols, fatty acid esters, waxes, low molecular weight polyolefins, fluorine-based resins and the like. According to the present invention, when a hydrophobic agent is used as the chemical agent, and the chemical granules are exposed on the surface of the excreta treatment material, the liquid excreta such as urine, once excreted, are more likely to be absorbed in the base granules at the lower end after having contacted the chemical granules, and therefore the hydrophobic agent that has been added to the chemical granules easily migrates into the base granules through the liquid excreta. As a result, during the next urination, the liquid excreta such as urine spreads more easily in the horizontal direction by the hydrophobic effect at the hydrophobic agent, and therefore even when the liquid excreta are absorbed into the base granules to form hard masses, the hard masses are shallow hard masses and are less likely to foul the bottom of the toilet container.

A deodorant to be used as the chemical agent for the present invention is not particularly restricted so long as it has deodorant action, and for example, it may be one that neutralizes ammonia odor, such as citric acid or sodium bicarbonate. According to the present invention, when a deodorant is used as the chemical agent, and the chemical granules are exposed on the surface of the excreta treatment material, the liquid excreta such as urine, once excreted, are more likely to be absorbed in the base granules at the lower end after having contacted the chemical granules, and therefore the deodorant that has been added to the chemical granules easily migrates or elutes into the liquid excreta, allowing the bad odors that are generated from the liquid excreta such as urine to be more efficiently prevented as a result.

The chemical agent may be adhered by spray atomizing or the like onto the surface of the hydrophobic coating layer formed on the water-absorbing base material, or a hydrophobic coating agent may be added beforehand during formation of the hydrophobic coating layer.

The chemical granules and base granules used in the excreta treatment material of the present invention will now be further explained. Similar to the chemical granules, the base granules are normally not completely spherical but partially sunken, and thus have slightly distorted, approximately spherical shapes. According to the present invention, the shapes of the base granules are not restricted to such shapes, and they may have any other shapes such as cylindrical.

The particle size of the base granules is not particularly restricted and may be 0.5 mm or greater and less than 8 mm, for example, but from the viewpoint of easier rising of the chemical granules in the excreta treatment material and allowing particulate substances made of materials with higher specific gravity, such as bentonite, to be directly used as the base granules, it is preferably 0.8 mm or greater and less than 6 mm.

The specific gravity of the base granules is not particularly restricted and may be about 0.1 to 1.5 $g/cm^3$ as the bulk specific gravity, for example, but from the viewpoint or easier rising of the chemical granules in the excreta treatment material and allowing particulate substances made of materials with higher specific gravity, such as bentonite, to be direct used as the base granules, it is preferably to 1.2 $g/cm^3$ and more preferably 0.8 to 1.0 $g/cm^3$ as the bulk specific gravity.

The structure and composition of the base granules are not particularly restricted so long as the base granules are a water-absorbing particulate substance, but the base granules are preferably a water-absorbing particulate substance that forms hard masses when has contacted with liquid excreta. The material of the water-absorbing base material that is to form such a water-absorbing particulate substance may be, for example, any material known in the prior art, which includes organic materials such as paper, pulp, wood dust, okara, used tea leaves or water-absorbent polymers, and inorganic materials such as be zeolite or silica gel. Of these, the material forming the water-absorbing base material is preferably one including main an inorganic material such as bentonite, zeolite or silica gel, from the viewpoint of easier formation of hard masses upon contacting liquid excreta such as urine, and easier production of chemical granules with the prescribed particle size or prescribed specific gravity. Here, "water-absorbing particulate substance that forms hard masses" refers to a particulate substance that forms hard masses after an elapse of 10 minutes when artificial urine has been dropped onto the particulate substance and allowed to stand.

Moreover, according to the present invention, the main material of the water-absorbing base material that is to form the chemical granules and the main material of the water-absorbing base material that is to form the base granules are preferably different materials, and most preferably, the water-absorbing base material that is to form the chemical granules includes the aforementioned organic material as the main starting material, and the water-absorbing base material that is to form the base granules includes the aforementioned inorganic material as the main starting material. When the main starting materials of the water-absorbing base materials differ, and especially when the water-absorbing base material that is to form the chemical granules include the aforementioned organic material as the main starting material and the water-absorbing base material that is to form the base granules includes the aforementioned inorganic material as the main starting material, is easier to form an excreta treatment material with the prescribed difference in particle size and difference in bulk specific gravity between the chemical granules and base granules, while the difference in particle size and the difference in bulk specific gravity between the chemical granules and base granules will be easier to adjust, so that the chemical granules in the excreta treatment material will rise up more easily or it will be easier to adjust the degree and timing with which the chemical granules rise.

The method for producing the chemical granules and base granules is not particularly restricted, and any granulation method known in the prior art may be applied. Examples of such methods include subjecting the material for the water-absorbing base material to a compacting granulator such as a disc pelleter, or an extruding granulator, to granulate a plurality of particulate substances, and drying them with a hot air drier or the like, and such methods can yield a water-absorbing particulate substance having a prescribed particle size and a prescribed bulk specific gravity. Incidentally, when producing chemical granules having the structure described above, they can be obtained either by forming a hydrophobic coating layer on the surface of the water absorbing particulate substance obtained in this manner and then adhering a chemical agent by spray atomizing or the like, or by forming a hydrophobic coating layer containing the chemical agent on the surface of the water-absorbing particulate substance.

The excreta treatment material of the present invention can be obtained by mixing a base granule group composed of aggregates of base granules, and a chemical granule group composed of aggregates of chemical granules, using any desired agitation mixer. The blending ratio for each granule group is not particularly restricted, but is preferably 0.1 to 30 parts by mass, more preferably 0.5 to 20 parts by mass and even more preferably 1 to 10 parts by mass of the chemical granule group, with respect to 100 parts by mass of the base granule group, from the viewpoint of easier rising of the chemical granules in the excreta treatment material, and effectiveness of the chemical agent, etc.

The excreta treatment material of the present invention may not only be used in an animal toilet according to the embodiment described above, but may also be applied as litter for breeding cages or barn stables, for example. Moreover, the excreta treatment material of the present invention is not restricted to the embodiments described above or the examples described below, and may incorporate appropriate modifications and combinations in a range that is not outside of the object and gist of the present invention.

EXAMPLES

The present invention will now be explained in more detail based on examples, with the understanding that the present invention is not limited to the examples.
[Fabrication of Excreta Treatment Material]
For the chemical granule groups comprising aggregates of chemical granules, a plurality of particulate substances, having a hydrophobic coating layer on an approximately spherical water-absorbing base material whose main starting material is pulp, and with addition of a perfume to the surface of the hydrophobic coating layer, are sorted by a sieve screening method, to obtain two types of chemical granule groups with different particle sizes, i.e. a chemical granule group with a particle size of 6 mm or greater and less than 8 mm, and a chemical granule group with a particle size of 8 mm or greater. Separately, several types of base granule groups composed of aggregates of water-absorbing particulate substances made of different materials (pulp, bentonite and zeolite) were prepared, and 5 L of the base granule groups was mixed with 100 mL of the chemical granule groups in the combinations shown in Table 1, to obtain excreta treatment materials for Examples 1 to 3 and Comparative Example 1. The particle sizes and bulk densities of the chemical granules and base granules used are also shown in Table 1.
[Evaluation of Ease of Rising of Chemical Granules]
The excrete treatment materials of Examples 1 to 3 and Comparative Example 1 were evaluated for ease of rising of the chemical granules upon application of vibration with a scoop, based on the exposed grain ratio (2) of the chemical granules obtained by the following test method.
(Test Method)
(1) The number of chemical granules in the excreta treatment material (i.e., the total number of chemical granules) was counted before mixing the base granule group and chemical granule group. The total number of chemical granules may also be counted after mixing the base granule group and chemical granule group.
(2) The excreta treatment material was placed in a tray with a prescribed size (45 cm×37 cm×8 cm), and the number of chemical granules exposed on the surface of the excreta treatment material in the tray (i.e., the number of exposed chemical granules at 0 agitations) was counted.
(3) After 10 repeated operations of scooping up the excreta treatment material in the tray with a scoop, the number of chemical granules exposed on the surface of the excreta treatment material (i.e., the number of exposed chemical granules at 10 agitations) was counted.
(4) After another 10 repeated operations of scooping up the excreta treatment material in the tray with a scoop following step (3), the number of chemical granules exposed on the surface of the excreta treatment material (i.e., the number of exposed chemical granules at 20 agitations) was counted.
(5) The number of exposed chemical granules at each number of agitations (0, 10 or 20) was divided by the total number of chemical granules, and the obtained value was converted to a percentage to calculate the exposed grain ratio (%) of chemical granules for each number of agitations.

3 Toilet container
4 Chemical granules
5 Base granules

TABLE 1

|  |  | Comp. Ex. 1 | Example 1 | Example 2 | Example 3 |
|---|---|---|---|---|---|
| Base granules | Type | Paper sand (pulp) | Paper sand (pulp) | Stone sand (bentonite) | Stone sand (zeolite) |
|  | Particle size | ≥6 mm, <8 mm | ≥6 mm, <8 mm | ≥1 mm, <4 mm | ≥6 mm, <8 mm |
|  | Bulk specific gravity (g/cm$^3$) | 0.40 | 0.40 | 0.95 | 0.90 |
|  | Content (L) | 5 | 5 | 5 | 5 |
| Chemical granules | Type | Paper sand (pulp) | Paper sand (pulp) | Paper sand (pulp) | Paper sand (pulp) |
|  | Particle size | ≥6 mm, <8 mm | ≥8 mm | ≥6 mm, <8 mm | ≥6 mm, <8 mm |
|  | Bulk specific gravity (g/cm$^3$) | 0.40 | 0.40 | 0.40 | 0.40 |
|  | Content (mL) | 100 | 100 | 100 | 100 |
|  | Total number of granules | 272 | 121 | 272 | 272 |
| Exposed grain ratio of chemical granules (%) | Repeated agitations 0 times | 22 | 31 | 19 | 40 |
|  | 10 times | 24 | 43 | 27 | 38 |
|  | 20 times | 21 | 39 | 38 | 42 |

Figure 6:
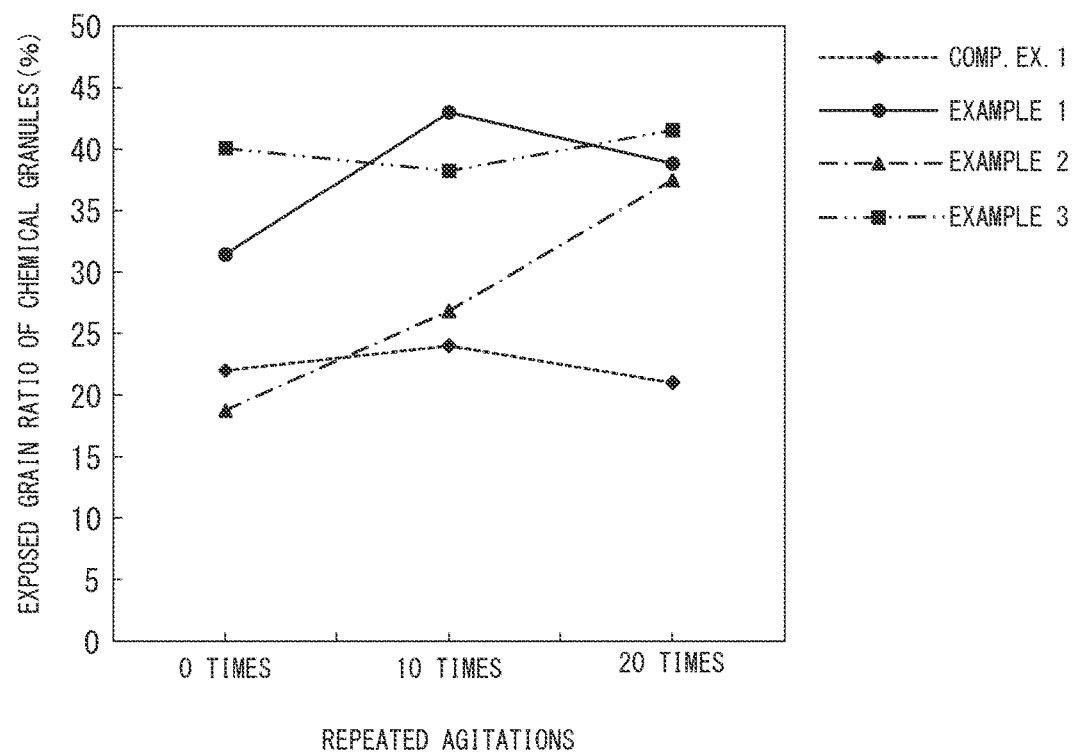
FIG. 6 is a graph showing the exposed grin ratio of chemical granules, for excreta treatment materials of the examples and a comparative example of the present invention.

Table 1 shows the results for the exposed grain ratios (%) of chemical granules for each number of agitations, obtained as described above. Also, FIG. 6 is a graph showing the exposed grain ratios of chemical granules for the excreta treatment materials of Examples 1 to 3 and Comparative Example 1. As shown in Table 1 and FIG. 16, Comparative Example 1 which had the same particle size and the same bulk specific gravity for the base granules and chemical granules had virtually no change in the exposed grain ratio of chemical granules from immediately after placing the excreta treatment material in the tray, even after an increasing number of agitations. On the other hand, Example 1 which had the same bulk density for the base granules and the chemical granules but a larger particle size of the chemical granules than the particle size of the base granules, had an increase of 31% in the exposed grain ratio of chemical granules immediately after placing the excreta treatment material in the tray, and with increasing number of agitators, the exposed grain ratio of chemical granules increased by around 40%. Furthermore, Example 2 which had a smaller bulk specific gravity of the chemical granules than the bulk specific gravity of the base granules and a larger particle size of the chemical granules than the particle size of the base granules, exhibited the same degree of exposed grain ratio of chemical granules as Comparative Example 1, immediately after placing the excreta treatment material in the tray; however, with increasing number of agitations, the exposed grain ratio of chemical granules increased, and with 20 agitations, the exposed grain ratio of chemical granules increased by nearly 40%. Moreover, Example 3 which had the same particle size for the base granules and chemical granules but a smaller bulk specific gravity of the chemical granules than the bulk specific gravity of the base granules, had a very high exposed grain ratio of chemical granules of 40% immediately after placing the excreta treatment material in the tray, and maintained the high exposed grain ratio even with increasing number of agitations.

REFERENCE SIGN LIST

1 Animal toilet
2 Excreta treatment material
3 Toilet container
4 Chemical granules
5 Base granules
6 Water-absorbing base material
7 Hydrophobic coating layer
8 Chemical agent
9 Hard mass

The invention claimed is:
1. An excreta treatment material comprising a plurality of particulate substances,
   the plurality of particulate substances comprising a mixture of:
   a base granule group composed of aggregates of a water-absorbing particulate substance, and
   a chemical granule group composed of aggregates of a chemical agent containing particulate substance, wherein
   the chemical granule group is displaced relatively upward, while the base granule group is displaced relatively downward as a result of application of vibration to the mixture, and
   when the particle size of the particulate substances is determined as the particle size (mm) at the median mass corresponding to 50 mass % from the particle size distribution obtained by a sieve screening method, the particle size of the chemical granules is 4 to 30 mm and the bulk specific gravity of the chemical granules is 0.1 to 1.5 g/cm$^3$, and the particle size of the base granules is 0.5 mm or greater and less than 8 mm and the bulk specific gravity of the base granules is 0.1 to 1.5 g/cm$^3$, and wherein
   (i) the particle size of the particulate substance composing the chemical granule group is larger than the particle size of the water-absorbing particulate substance composing the base granule group,
   (ii) the bulk specific gravity of the particulate substance in the chemical granule group is lower than the bulk specific gravity of the water-absorbing particulate substance in the base granule group, or
   (iii) the particle size of the particulate substance composing the chemical granule group is larger than the particle size of the water-absorbing particulate substance composing the base granule group, and the bulk specific gravity of the particulate substance in the chemical granule group is lower than the bulk specific gravity of the water-absorbing particulate substance in the base granule group.

2. The excreta treatment material according to claim 1, wherein a difference between the particle size at median mass of the particulate substance and the particle size at median mass of the water-absorbing particulate substance is 2 mm or greater.

3. The excreta treatment material according to claim 1, wherein the chemical agent includes at least one agent selected from a group consisting of perfume, antimicrobial agent, examination agent, hydrophilic agent, hydrophobic agent and deodorant.

4. The excreta treatment material according to claim 1, wherein the particulate substance in the chemical granule group is a particulate substance that does not form hard masses when having contacted liquid excreta.

5. The excreta treatment material according to claim 1, wherein a main starting material of the water-absorbing base material forming the particulate substance in the chemical granule group and a main starting material of the water-absorbing base material forming the water-absorbing particulate substance in the base granule group are different materials.

6. The excreta treatment material according to claim 1, wherein the water-absorbing base material forming the particulate substance in the chemical granule group includes an organic material as the main starting material, and the water-absorbing base material forming the water-absorbing particulate substance in the base granule group includes an inorganic material as the main starting material.

7. The excreta treatment material according to claim 1, wherein the particulate substance in the chemical granule group includes a water-absorbing base material and a hydrophobic coating layer that covers the water-absorbing base material, with a chemical agent added to the surface of the hydrophobic coating layer.

8. The excreta treatment material according to claim 2, wherein the chemical agent includes at least one agent selected from a group consisting of perfume, antimicrobial agent, examination agent, hydrophilic agent, hydrophobic agent and deodorant.

9. The excreta treatment material according to claim 2, wherein the particulate substance in the chemical granule group is a particulate substance that does not form hard masses when having contacted liquid excreta.

* * * * *